(12) United States Patent
Almagor et al.

(10) Patent No.: US 10,502,531 B2
(45) Date of Patent: Dec. 10, 2019

(54) SHOOTING TRAINING SYSTEM

(71) Applicant: Erange Corporation, Englewood Cliffs, NJ (US)

(72) Inventors: Ofir Moshe Almagor, Englewood Cliffs, NJ (US); Yuval Stern, Even-Yehuda (IL)

(73) Assignee: Erange Corporation, Englewood Cliffs, NJ (US)

( * ) Notice: Subject to any disclaimer, the term of this patent is extended or adjusted under 35 U.S.C. 154(b) by 0 days.

(21) Appl. No.: 16/249,945

(22) Filed: Jan. 17, 2019

(65) Prior Publication Data

US 2019/0154401 A1 May 23, 2019

Related U.S. Application Data

(63) Continuation of application No. PCT/IB2017/054311, filed on Jul. 17, 2017.

(Continued)

(51) Int. Cl.
| | |
|---|---|
| *F41G 3/26* | (2006.01) |
| *F41G 3/00* | (2006.01) |
| *F41G 3/14* | (2006.01) |
| *G06T 7/73* | (2017.01) |
| *F41J 5/10* | (2006.01) |
| *G06K 9/00* | (2006.01) |

(52) U.S. Cl.
CPC ............ *F41G 3/26* (2013.01); *F41G 3/00* (2013.01); *F41G 3/142* (2013.01); *F41G 3/2605* (2013.01);
(Continued)

(58) Field of Classification Search
CPC . F41G 3/26; F41G 3/2655; G06T 7/73; G06T 2207/30196; F41J 5/10; G06K 9/00342; G06K 9/00664
(Continued)

(56) References Cited

U.S. PATENT DOCUMENTS 4,457,715 A * 7/1984 Knight ................. F41G 3/2616
434/22
8,587,659 B1 11/2013 Socolinsky et al.
(Continued)

FOREIGN PATENT DOCUMENTS

WO  WO 2018/015870  1/2018

OTHER PUBLICATIONS

International Preliminary Report on Patentability dated Jan. 31, 2019 From the International Bureau of WIPO Re. Application No. PCT/IB2017/054311. (8 Pages).
(Continued)

*Primary Examiner* — Robert P Bullington

(57) ABSTRACT

A method for calculation of real time shooting instructions by calibrating data extracted from images of a shooting target and outputs of an inertial measurement unit (IMU) mounted on the body of a shooter. The method comprises calculating a result of a shooting event, calculating at least one physiological parameter of the shooter during a period preceding the shooting event according to an analysis of outputs of the IMU which is supported by at least one wearable device worn by the shooter, calculating shooting parameter by correlating between the at least one physiological parameter and the result, and instructing a presentation of shooting instructions calculated based on additional outputs of the IMU and the shooting parameter on a display of the mobile device or by a presentation unit of the at least one wearable device before an additional shooting event is detected.

19 Claims, 11 Drawing Sheets

Related U.S. Application Data

(60) Provisional application No. 62/363,271, filed on Jul. 17, 2016.

(52) U.S. Cl.
CPC .............. *F41G 3/2655* (2013.01); *F41J 5/10* (2013.01); *G06K 9/00342* (2013.01); *G06K 9/00664* (2013.01); *G06T 7/73* (2017.01); *G06T 2207/30196* (2013.01)

(58) Field of Classification Search
USPC ......................................................... 434/190
See application file for complete search history.

(56) References Cited

U.S. PATENT DOCUMENTS

| | | | |
|---|---|---|---|
| 2011/0212790 A1 | 9/2011 | Webb | |
| 2012/0258432 A1* | 10/2012 | Weissler | F41J 5/10 434/20 |
| 2013/0337415 A1 | 12/2013 | Huet | |
| 2015/0285593 A1* | 10/2015 | Dribben | F41J 5/10 434/19 |
| 2015/0366504 A1 | 12/2015 | Connor | |
| 2016/0007915 A1 | 1/2016 | Berka et al. | |
| 2016/0033221 A1* | 2/2016 | Schmehl | F41A 33/00 42/90 |
| 2016/0300506 A1* | 10/2016 | Reichow | F41G 3/26 |

OTHER PUBLICATIONS

International Search Report and the Written Opinion dated Nov. 22, 2017 From the International Searching Authority Re. Application No. PCT/IB2017/054311.

Office Action dated Mar. 28, 2019 From the Israel Patent Office Re. Application No. 264315 and its Translation Into English. (5 Pages).

* cited by examiner

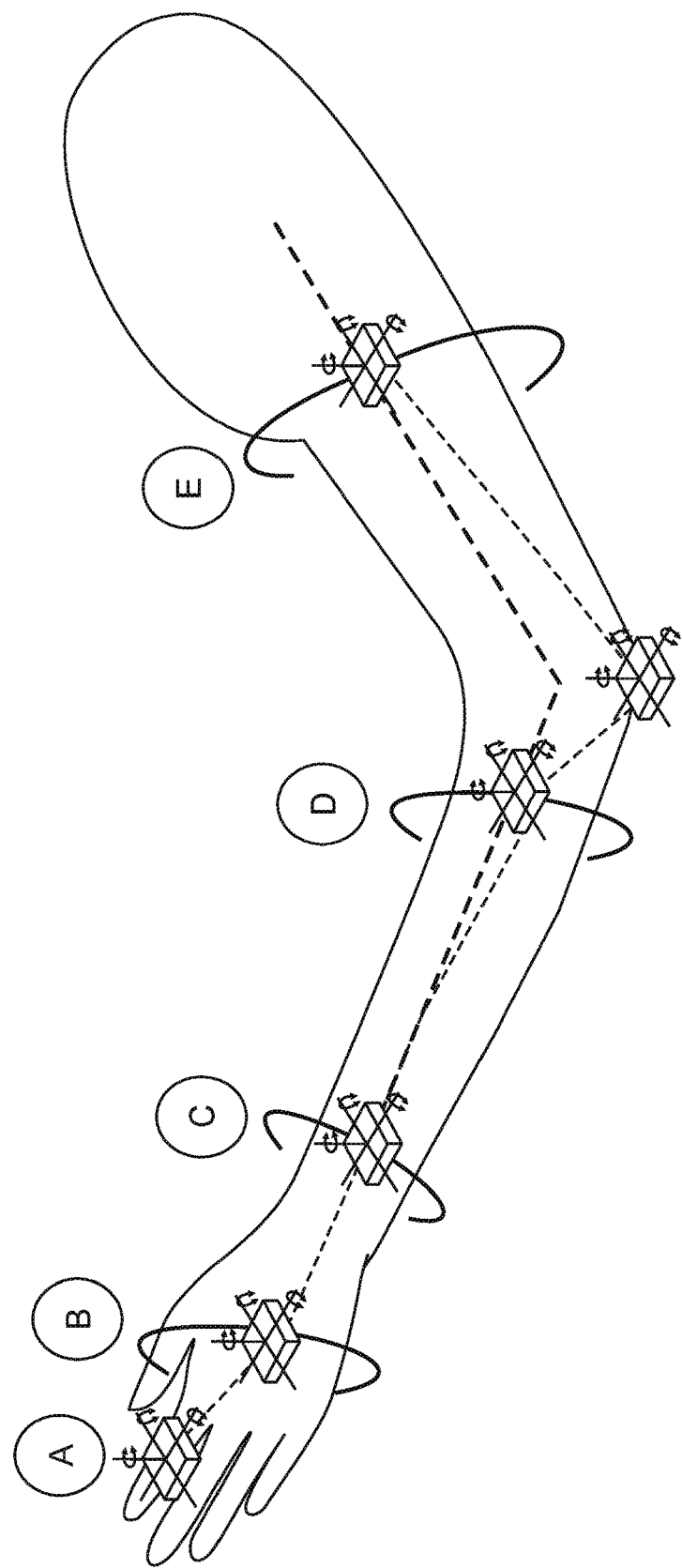

SHOOTING TRAINING SYSTEM

RELATED APPLICATIONS

This application is a Continuation of PCT Patent Application No. PCT/IB2017/054311 having International filing date of Jul. 17, 2017, which claims the benefit of priority under 35 USC § 119(e) of U.S. Provisional Patent Application No. 62/363,271 filed on Jul. 17, 2016. The contents of the above applications are all incorporated by reference as if fully set forth herein in their entirety.

FIELD AND BACKGROUND OF THE INVENTION

The present invention, in some embodiments thereof, relates to shooting training and, more specifically, but not exclusively, to systems and methods for automatic shooting training based on image processing and/or wearable sensors.

Instruction in the proper use of firearms is an important part of the training of military and law enforcement personnel. It is also of interest to sportsmen, particularly instruction which promotes safer use of firearms in recreational settings.

In conventional firearm training, a user is instructed as to the proper stance, aiming and firing of the firearm. This may involve firing in various positions or while moving with respect to the target. Accuracy can be determined by examining the location of bullet holes in the target. Some users, however, have difficulty developing the skills necessary to properly position the firearm through aiming, the squeezing of the trigger and the follow-through.

SUMMARY OF THE INVENTION

According to some embodiments of the present invention there is provided a method for calculation of real time shooting instructions by calibrating data extracted from images of a shooting target and outputs of at least one inertial measurement unit (IMU) mounted on the body of a shooter. The method comprises calculating a result of a shooting event of a firearm by an image processing analysis of at least one image from at least one image sensor of a mobile device, the at least one image depicts a shooting target, calculating at least one physiological parameter of the shooter during a period preceding the shooting event according to an analysis of outputs of the at least one IMU which is supported by at least one wearable device worn by the shooter, calculating at least one shooting parameter by correlating between the at least one physiological parameter and the result, calculating shooting instructions based a correlation between additional outputs of the at least one IMU and the at least one shooting parameter, and instructing a presentation of the shooting instructions on a display of the mobile device or by a presentation unit of the at least one wearable device before an additional shooting event is detected.

Optionally, the analysis of outputs of the at least one IMU comprises correlating outputs of a gyro module of the at least one IMU with outputs of an accelerometer module of the at least one IMU.

Optionally, the method comprises detecting the shooting event by an analysis of the at least one image.

Optionally, the method comprises instructing a presentation a correctness of a shooter physical state based on an analysis of the additional outputs of the at least one IMU on the display or by the presentation unit.

According to some embodiments of the present invention there is provided a system for calculation of real time shooting instructions by calibrating data extracted from images of a shooting target and outputs of at least one inertial measurement unit (IMU) mounted on the body of a shooter. The system comprises a mobile device having at least one processor and at least one image sensor adapted to capture at least one image depicting a shooting target, at least one wearable device having a mount supporting a location of the at least one IMU while the at least one wearable device is worn by the shooter. The at least one processor adapted to execute a training code for: calculating a result of a shooting event of a firearm by an image processing analysis of the at least one image, calculating at least one physiological parameter of the shooter during a period preceding the shooting event according to an analysis of outputs of the at least one IMU, calculating at least one shooting parameter by correlating between the at least one physiological parameter and the result, calculating shooting instructions based a correlation between additional outputs of the at least one IMU and the at least one shooting parameter, and instructing a presentation of the shooting instructions on a display of the mobile device or by a presentation unit of the at least one wearable device before an additional shooting event is detected.

Optionally, the at least one shooting parameter is calculating using a classifier generated by a machine learning technique.

Optionally, the at least one wearable device further comprises an additional sensor for detecting pressure applied by a finger on a trigger of the firearm; wherein the analysis comprises combining the pressure with the outputs of the at least one IMU.

Optionally, the at least one wearable device further comprises an additional sensor for measuring at least one biological parameter of the shooter; wherein the analysis comprises combining the at least one measured biological parameter with the outputs of the at least one IMU.

More optionally, the additional sensor is selected from a group consisting of a Heart rate monitor (HRM), a moisture sensor, a temperature sensor, a plethysmogram, and/or an Electrodermal activity (EDA) Sensor (a Galvanic skin response (GSR) Sensor, engagement sensor, and/or excitement sensor.

More optionally, the at least one measured biological parameter is selected from a group consisting of body temperature, blood pressure, pulse (heart rate), and breathing rate.

Optionally, the at least one wearable device is a bracelet.

Optionally, the at least one wearable device comprises a compression sleeve; wherein the at least one IMU comprises an upper IMU mounted to be placed above an upper arm of an arm of the shooter and a lower IMU mounted to be placed above a lower arm of the.

Optionally, the at least one wearable device comprises a pair of sleeves locating the at least one IMU to monitor knees during the period.

Optionally, the at least one wearable device comprises a glove locating an additional sensor to monitor pressure applied by the shooter on a trigger of the firearm during the period; wherein the analysis comprises combining the pressure with the outputs of the at least one IMU.

Optionally, the at least one wearable device comprises a ring or a sticker locating an additional sensor on a finger of the shooter to monitor pressure applied by the shooter on a trigger of the firearm during the period; wherein the analysis comprises combining the pressure with the outputs of the at least one IMU.

Optionally, the at least one wearable device comprises a plurality of compression sleeves each worn by a different limb of the shooter; wherein the calculating at least one physiological parameter is performed by correlating outputs from the plurality of compression sleeves.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 10A is a schematic illustration of an exemplary sleeve having IMUs integrated therein, according to some embodiments of the present invention.

DETAILED DESCRIPTION OF SPECIFIC EMBODIMENTS OF THE INVENTION

Figure 1:
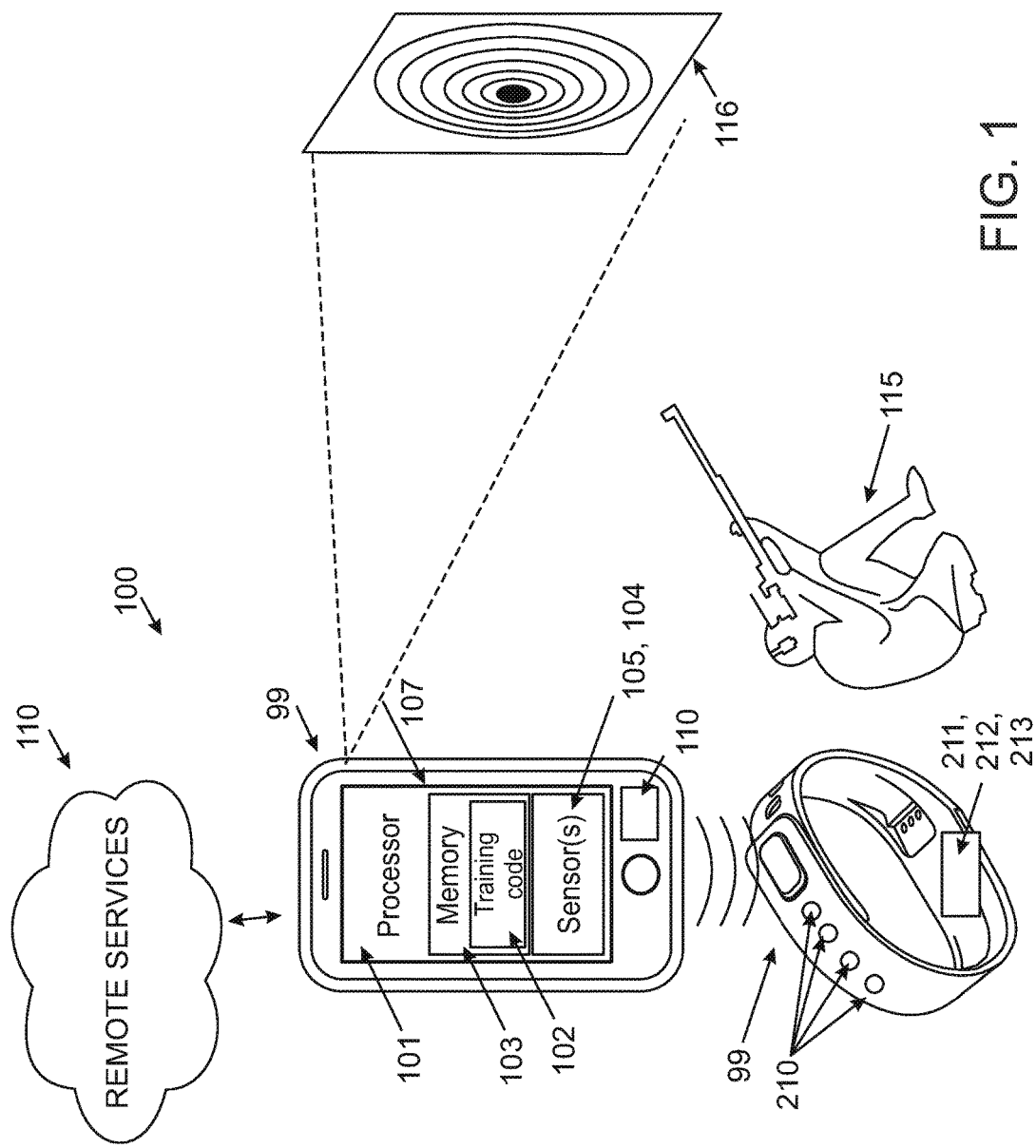
FIG. 1 is a schematic illustration of a training system for calculating real time shooting instructions for a shooter by analyzing images of a shooting target which are captured using a mobile device during shooting session(s) and movement readings captured using inertial measurement unit(s) installed in wearable device(s), according to some embodiments of the present invention.

The present invention, in some embodiments thereof, relates to shooting training and, more specifically, but not exclusively, to systems and methods for automatic shooting training based on image processing and/or wearable sensors.

According to some embodiments of the present invention, there is provided a system having a mobile device with one or more imaging sensors to capture images of the target and a wearable device with an IMU to capture movement data automatically generating and presenting to a shooter real time shooting instructions. In use, the user is presented with shooting instructions, for example using a set of light emitting diodes or vibrating units which are installed on the wearable device. The shooting instructions guide his pose, breathing and/or aiming direction and/or letting him know when he is in a recommended shooting position. The wearable device may include one or more sleeves with IMUs which are mounted to be on top of a lower arm and an upper arm of a user. The wearable device may include one or more pressure sensors to detect a pressure applied on a trigger.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1 which is a schematic illustration of a training system 100 for calculating real time shooting instructions for a shooter 115 by analyzing one or more images of a shooting target 116 which are captured using a mobile device 99 during shooting session(s) and movement readings captured using inertial measurement unit(s) (IMU(s)) 211 installed in one or more wearable device(s) 98, according to some embodiments of the present invention. The firearm may be any firearm, for instance automatic, semi-automatic (self-loading) and manual firearm. The firearm may be a rifle or a handgun.

As used herein, a bullet hole is a hole formed in a shooting target 116 by bullets shot by a firearm targeted at a single shooting session. A single shooting session may include a number of shooting rounds which result in a number of shooting holes, for example 5 rounds of shootings at the shooting target 116 when it is placed at a 25 meter distance or 100 meter distance from the shooter. As used herein, a firearm type, a firearm sight type or a combination thereof may be referred to herein interchangeably. Although the term shooting hole is used herein, a laser point indicating a shooting location may be considered as a shooting hole when a laser marker is used to mark shooting events. In such embodiments, the firearm may be enhanced with a recoil impulse generator for simulating shooting effect.

Shooting instructions are instructions to a shooter 115 to change the way he is holding a firearm, his pose during a shooting session, his breathing pace or breathing pattern during a shooting session and/or the like. The mobile device 99 of the system 100 includes a processor 101 executing a training code 102 for calculating shooting instructions, a memory 103 hosting the training code 102, one or more image sensor(s) 104 such as camera(s) for capturing one or more images of the shooting target 116 and optionally one or more sensors 105 such as accelerometers which monitor usage of a firearm by a user 115 during the shooting session. The training code 102 may be an app store application or an application installed directly on a mobile device 99. The training code may be program instructions stored in a non-transitory medium, for example a software application executed on one or more processing nodes having one or more processors. The mobile device 99 may be or include a handheld device, such as a mobile phone or a tablet or a smartwatch. The mobile device 99 may be a camera installed at a shooting line and connected to a computing unit, such as a processor.

The processor(s) of the training system 100 may reside on, a server, a computer, a desktop, a tablet, a smartphone which communicates with the mobile device 99. The image sensor(s) 104 may be, for example, an image sensor such as a camera, a stereoscopic camera, a night-vision camera and/or an infra-red (IR) camera which are optionally integrated into the handheld device. The sensors 105 may include, for example, an audio sensor such as a microphone, an accelerometer, a gyroscope and an imaging sensor which optionally monitor a front end of a barrel of the firearm. The training code may include instructions to operate a user interface, for example, a graphical user interface (GUI) designed to be presented to user 115 on a presentation unit such as a speaker or a display 107, optionally the integrated speaker or display of the handheld device. The GUI maybe used to allow the user input information such as firearm and/or sight type, model, unique identifier (ID) and/or any aftermarket accessory, trigger, custom barrel and/or the like.

The wearable device(s) 98 is optionally a smartwatch, a bracelet, and/or a compression sleeve having integrated therein the IMU 211, a processor and/or a controller 212, optionally on a common printed circuit board (PCB) with the IMU 211, a wireless communication interface 213 for establishing a wireless channel, optionally bidirectional, with the mobile device 99, for example via a wireless interface 110 of the mobile device 99.

In some embodiments, the wearable device 98 is a sleeve such as a compression sleeve having one or more IMUs 211 integrated therein. For example, one IMU is located to be mounted in touch with or on top of the lower arm while another IMU is located to be mounted in touch with or on top of the upper arm (e.g. one IMU above the elbow and another IMU below the elbow). When the elbow is locked, an axis of the gyroscope is optionally recorded to indicate a locked shooting position.

Figure 10B:
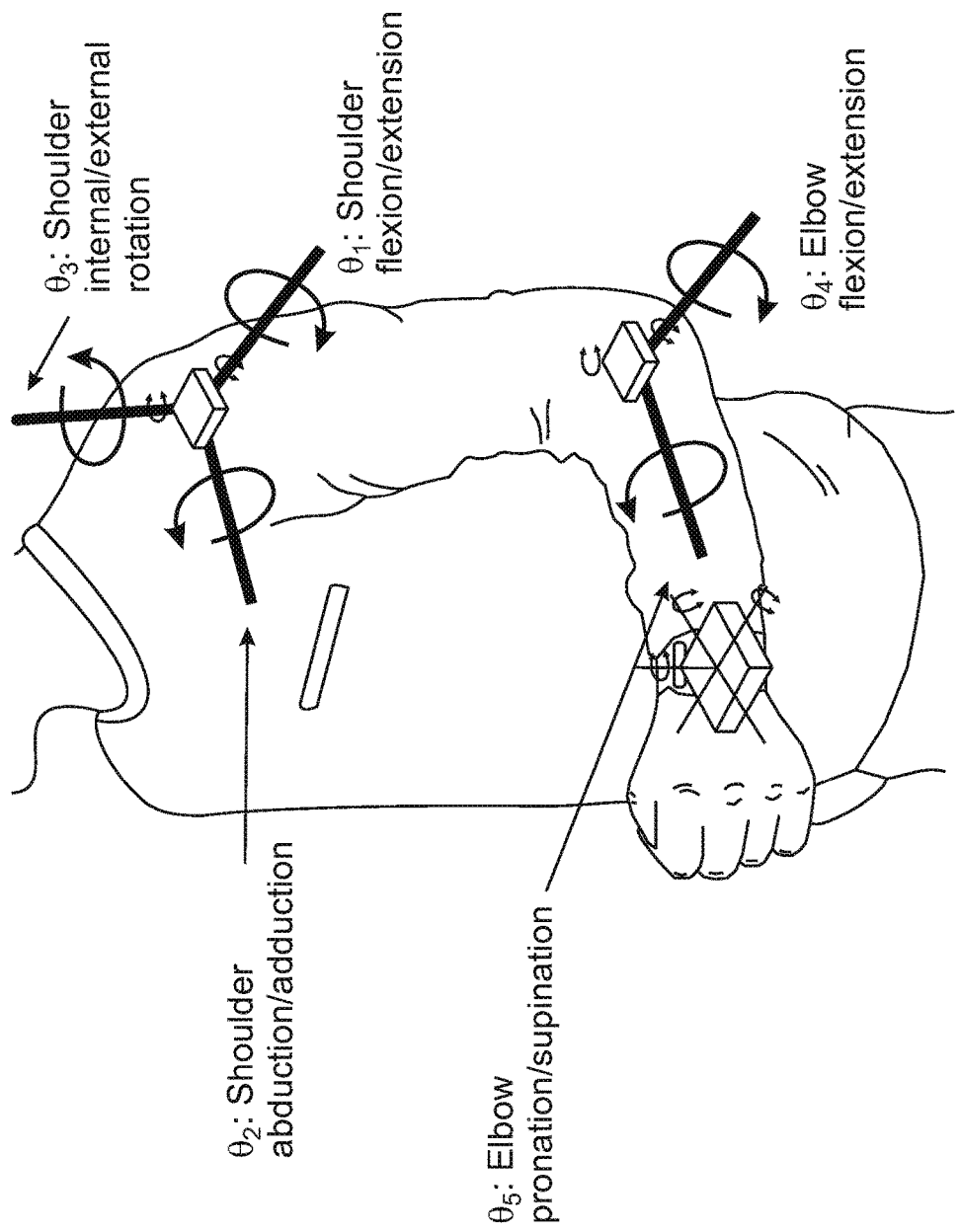
FIG. 10B is an image having marking thereon to depict an exemplary sleeve having IMUs integrated therein and the reading thereof, according to some embodiments of the present invention.

For example, reference is made to FIGS. 10A and 10B which depict exemplary distributions of IMU units in a sleeve, according to some embodiments of the present invention. The outputs of the IMU units may be used to calculate an angle ratio and render arm position and mechanics before, during and after a shot is taken during a shooting round. The data may allow the system 100 to train and predict each shot as described herein. Optionally, the system 100 scores parameters acquired using different IMU units differently to increase a resolution of mapping firearm manipulation and the correlation to location of hit and miss data (LOMAH).

Reference is now made, once again, to FIG. 2. In some embodiments, the wearable device(s) 98 comprises a plurality of wearable devices each adapted to monitor a different limb. In such an embodiment physiological parameters and/or shooting recommendations may be based on a correlation between outputs of different IMUs from different limbs and/or based on a combination of outputs of different IMUs from different limbs. For example, the wearable devices 98 are two compression sleeves placed on the knees to measure distance between the legs and position with respect to each other.

Optionally, IMU outputs are measured to identify that the firearm is held in a specific position in order to reach a highest level of accuracy. For example, gyroscope and accelerometer record shooter's weapon manipulation and the recorded data are compared to a standard or a pattern required in order getting optimal performance and technique. For example, when all axes are aligned to "Skeleton Zero" where the body is position optimally in terms of stance and firearm aiming to the target 216 the array of LEDs 210 and/or the display 107 may indicate that the shooter is ready to fire, for example as described below. It should be noted that as the physiology of different shooters varies, each shooter may use the system 100 to guide him according to a personalized reference skeleton position with respect to standard shooting techniques. The personalized reference skeleton position may be set in advance, for example as part of a calibration of the system 100. For example, a personalized ID may be calibrated using outputs of the IMU and the additional sensors which are described herein, for instance to include a shooter's mass, size, skeleton stance, biomechanics, biological indicators and/or the like. This data may also be provided manually or forwarded from external measuring devices or sources 110.

Optionally, the system 100 connects to one or more remote services 110, for example, a database and/or an analytics service for generating reports and/or for storing outputs of the training process and/or shot group data. The remote services 110 may be available through, for example, a cloud service, a module executed on one or more remote processing nodes, for example, a server and the likes.

In use, as further described below, physiological parameter(s) are calculated based on the analysis of pre shooting outputs of the IMU 211 which are recorded before a shooting event is detected, for instance by a shoot event detection analysis of outputs of the IMU 211 and/or shoot event detection analysis of images of the target 116. The pre shooting outputs are optionally captured in a period of 1, 2, and 5 seconds or any intermediate or shorter period before the shooting event.

Optionally, the physiological parameter(s) are calculated by the processor 101 based on the analysis of the outputs which are received via the wireless channel. The physiological parameter(s) are or indicative of a stress level, hand firmness, a breathing pattern and/or any other physiological parameter that has a known effect on shooting performance. As further described below, the physiological parameter(s) may be used for calculating a shooting parameter optionally together with an analysis of a result of the respective shoot event (e.g. the shoot event which was detected just after the pre shooting outputs have been recorded). The shooting parameter is optionally used for calculating shooting instructions based on a correlation with IMU outputs which are captured after the respective shoot event, for instance the IMU outputs captured while the shooter maneuver the firearm to perform the following shooting, before the following shooting event occurs and detected. Optionally, the shooting instructions are presented on a display 107 of the client device 99 and/or on a presentation unit of the wearable device 98 before an additional shooting event is detected. The presentation unit may be, for example, an array of light emitting diodes, such as 210 and/or a display such as an organic light-emitting diode OLED display.

Optionally, by analyzing IMU outputs, shooting performance and technique is evaluated and optionally, cause(s) to malfunctioning behavior are identified and presented to the shooter. For example, acceleration patterns of an ideal shooting technique are acquired from services 110 and/or from a local storage and compared with IMU outputs such as acceleration data to provide the shooter with feedback such as: "You moved your hand too fast" and/or "Hold your hand more firm before shooting".

Figure 2:
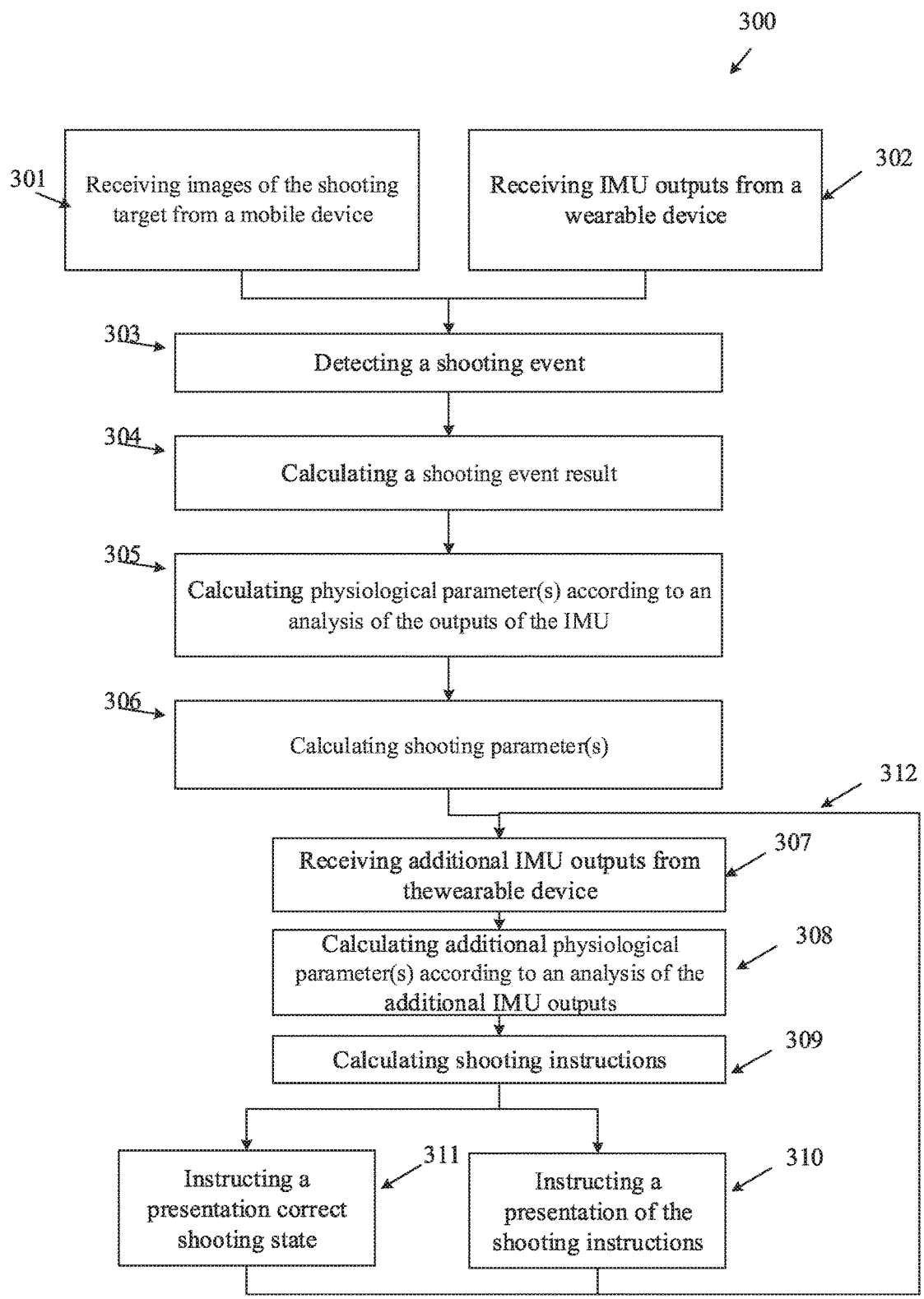
FIG. 2 is a flowchart of an exemplary process for calculating real time shooting instructions for a shooter using a firearm, optionally using the training system of FIG. 1, according to some embodiments of the present invention.

Reference is also made to FIG. 2, which is a flowchart of an exemplary process for calculating real time shooting instructions for a shooter using a firearm based on an analysis of images of a shooting target captured by the mobile device 99 and IMU outputs as captured from the wearable device(s) 98, according to some embodiments of the present invention. The process 300 may be used for calculating real time shooting instructions for calibrating a firearm such as a gun, a pistol and/or a rifle or sight. The process 300 may be executed on a processor(s) of the mobile device 99 which may be a Smartphone or a tablet or one or more processing nodes, for example, a local processing node, such as a computer, a server and/or a cluster of processing nodes and/or on a remote processing node, for example, a remote server, a remote server-cluster and/or a cloud service. Optionally, the process 300 is split between two or more of the processing nodes such that each of the processing nodes executes one or more segments of the process 300. In one example, the process 300 is split between the processor of the mobile device 99 and the processor of the wearable device(s) 98.

In use, the mobile device 99 placed in a mount along a shooting line with the shooting target. This allows the mobile device 99 to capture images of the shooting target 216. As shown at 301, these images are received by the processor 201 for processing according to the training code 102.

In use, the wearable device(s) 98, for instance bracelet(s), smart watch(s) and/or compression sleeve(s) are worn by the shooter 215. This allows the IMU 211 to measure the effect of physiological factors such as limb movements, breathing and/or the like. This allows the wearable device(s) 98 to forward to the mobile device 99 the IMU outputs. As shown at 302, these IMU outputs are received by the processor 201 for processing according to the training code 102. Optionally, the wearable device(s) 98 are sleeves designed to mount IMUs 211 on top of joints of limb bones. Optionally, the wearable device(s) 98 include a glove with one or more pressure sensors to determine a stiffness level of a shooter and use it as described below with reference to additional sensor data.

Optionally, and in parallel to the data captured using the IMU 211, additional physiological parameters are captured using additional sensors, for example body temperature, sweating level, blood pressure, pulse (heart rate), and breathing rate (respiratory rate), often notated as BT, BP, HR, and RR. 301 and 302 are optionally held during each of a plurality of shooting rounds during a shooting session. As used herein, a shooting round is a period before a shooting event, optionally after a preceding shooting event in the shooting session. As used herein a shooting event is the action of firing itself, for example a singular point in time during which a shooting is detected by an analysis of the images captured by the mobile device 99 and/or the outputs of the IMU 211 and/or a signal captured using an audio sensor and/or any sensor that outputs thereof are read and processed by the processor 101.

Optionally, the outputs of the IMU 211 of include outputs both a gyroscope module and an accelerometer, for example from MPU-6050 which the specification thereof is incorporated herein by reference. In such embodiments, the outputs of the IMU 211 provide data on a tilt and a rotation of a firearm and/or shooter's hand before, during and after a shooting event. By analyzing gyroscope data together with acceleration data, the performance of the shooting and the cause(s) for malfunctioning shooting can be more accurately evaluated as the gyroscope provides additional information on the shooting in dimensions that acceleration does not provide such as tilt position. Additionally or alternatively, accelerometer data is correlated based on gyroscope data.

Optionally, additional sensor data includes outputs of a Heart rate monitor (HRM), a moisture sensor, a temperature sensor, a plethysmogram, and/or an electrodermal activity (EDA) sensor (a galvanic skin response (GSR) sensor, engagement sensor, and/or excitement sensor. Such sensor outputs may be used to measure sympathetic nervous system arousal and to derive features related to stress, engagement, and/or excitement. In use, the sensor data is synchronized with the outputs of the IMU and optionally with the images captured by the image sensor(s) 104. For example, when acceleration pattern and HRM and/or sweat pattern are synchronized, a correlation therebetween, and optionally with a results of a shooting round as described below, may be indicative that a high stress of the shooter leads to malfunctioning shooting. This shows the shooter the importance of relaxation, incentivize him to relax before and/or during the shooting session. Respective shooting instructions for relaxation may be calculated as described below.

Optionally, additional imaging data is captured by one or more cameras imaging the shooter. This additional imaging data may be used to identify an imprint of reference skeleton pose and prediction of location of hit and miss data (LOMAH) data based on shooter's biological indicators. Optionally, the additional imaging data records the user position, center of mass, and/or elbows locking. This allows correlating such shooter information with the other outputs (e.g. IMU outputs) to provide a feedback to the user and/or shooting parameters and/or instructions such as change distance between knees, move to optimal skeleton, leaning forward and/or backwards, adapt stability, change knee position, change elbow position, and/or adjust back strait and/or band, adjust position of other shooter hand using additional camera we can send the user (prior shooting) if he is ready to shot and how to improve his body position in order to get the best performance.

Figure 3:
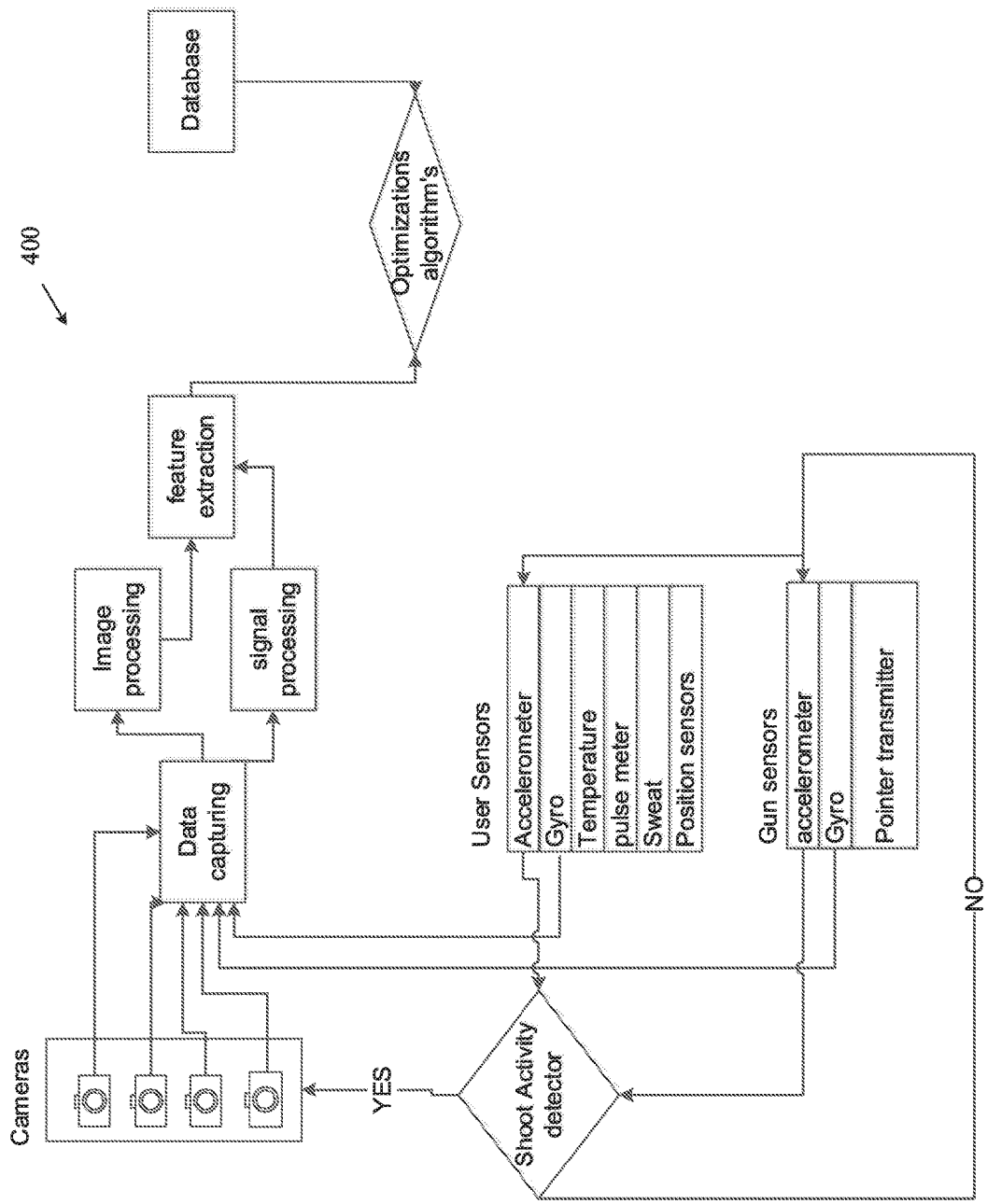
FIG. 3 is a schematic illustration of a training system, according to some embodiments of the present invention.

In some embodiments of the present invention, a system 400 as depicted in FIG. 3 is used. System 400 includes sensors that are capturing shooter position, weapon position and tilt, shooter physical condition using sweet sensor and/or or humidity sensor. The training code includes modules such as a data capturing module, signal processing module or unit, an image processing module, feature extraction module for detecting bullet holes, and optimizing algorithms such as a classification algorithm and a pattern matching algorithm to determine a shooter position. The algorithms are optionally correlated with personalized shooting and hits information to allow estimating more accurately a position of a shooter.

The system 400 may instruct presenting a feedback, for instance using the LED array or vibrating units 210, during shooting or after shooting or send an acknowledgment when shooter is in the right position and the firearm is pointing towards the target 216. The indication may be a sequence of lights and/or vibrations generated by the presentation unit 210.

As shown at 303, one or more shooting event(s) are detected to conclude a shooting round. A shooting event may be detected by processing the images of the target 216 which are captured using the image sensor(s) 104. The processing is optionally held by the processor 101. Such image processing may be applied to detect a change in the target, for example as an outcome of a new shooting bullet hole therein. Additionally or alternatively, the shooting event is detected when a movement pattern is detected based on an analysis of the outputs of the IMU 211. Additionally or alternatively, the shooting event is detected when an explosion sound is identified from the analysis of sound recorded using an audio sensor on the mobile device 99 and/or the wearable device 98. Optionally, a shooting event is detected when the explosion sound is detected at the same time (or about the same time) that a shooting movement pattern and/or a change in the target 216 is detected. In such a manner, explosion sounds which are outcomes of nearby shooting which are not done by the shooter 215 are ignored.

As shown at 304, a shooting event result of the shooting event is calculated, for example by an image processing analysis of the images of the target 216. The calculation is optionally held by the processor 101. The shooting event result may be indicative of a deviation or an absence of shooting hole(s) from a center of the target.

As shown at 305, one or more physiological parameter(s) of the shooter during a period preceding the shooting event (pre shooting event period) a calculated according to an analysis of the outputs of the IMU 211 during the period preceding said shooting event. The physiological parameters may be or indicative of a stress level, hand firmness level, a breathing pattern and/or any other physiological parameter that has a known effect on shooting performance. For example, the pre shooting event period is identified based on a time tag given to the detected shooting event and outputs of the IMU captured during the pre shooting event period are extracted.

As shown at 306, shooting parameter(s) are calculated by correlating between the physiological parameter(s) and the shooting event result. Optionally, the correlation is identified also with additional sensor data and/or additional imaging data which are captured as described above. The shooting parameter(s) may be an estimate of an effect of different physiological parameters on the shooting. Optionally, the shooting parameter(s) are an output of a classifier receiving the physiological parameter(s) and the shooting event result as an input. The classifier is optionally generated in a machine learning process wherein recording of physiological parameter(s) and results in a plurality of shooting interactions of different shooters are recorded and used as a training set, for example as known in the art.

The shooting parameter(s) can now be used for calculating shooting instructions for the shooter 215 for following shooting rounds. For example, at shown at 307 and 308 additional outputs of the IMU 211 are received and used for calculating additional physiological parameters of the shooter, for example in a following pre shooting event period after the shooting event was detected. This allows, as shown at 309, calculating shooting instructions based a correlation between the additional physiological parameter(s) and the shooting parameter(s).

Figure 4C:
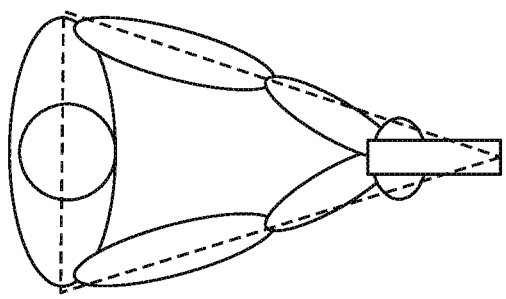
FIGS. 4A-4C are schematic illustrations an exemplary reference skeleton position from various points of view (e.g. lateral, frontal, and overhead)
Figure 4B:
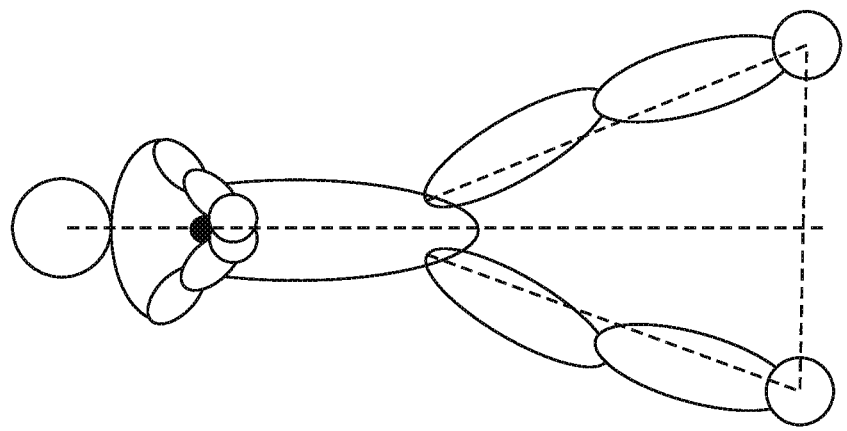
Figure 4A:
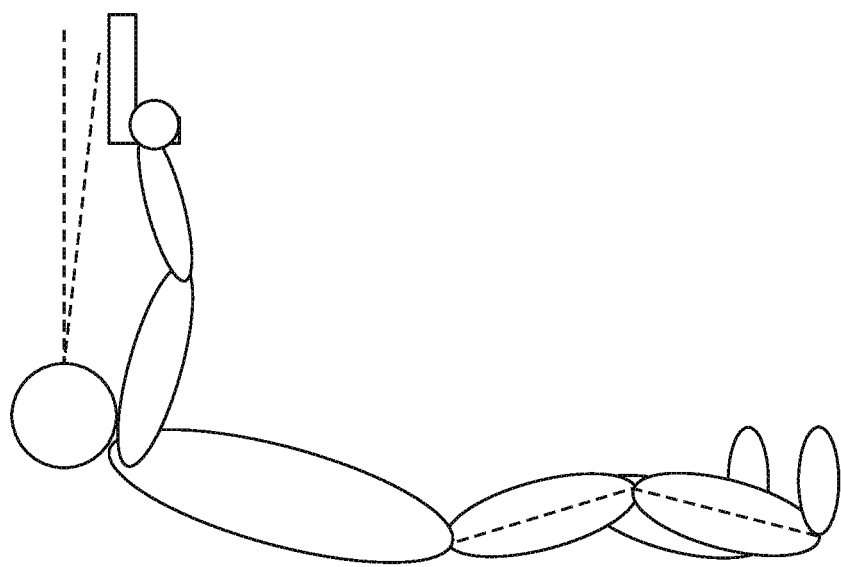

As described above, outputs of the IMU may be acquired and synced with imaging data and/or data of additional sensors. The combination of outputs from different sensors may allow detection of a weak firearm gripping, for example by detecting undesired hand motion or trembling during or just before the shooting event. This can be done by comparing imaging data and/or data of additional sensors with IMU outputs. This allows calculating instructions indicative of firearm holding firmness, firearm holding elasticity, and/or recommendations how to improve a shooting technique in order to get optimal shooting. FIGS. 4A-4C depict an exemplary reference skeleton position from various points of view (e.g. lateral, frontal, and overhead) which may be used for normalizing images of the shooter.

It will be correlated with optimal shooting position and feedback to the user will be generated.

Figure 5B:
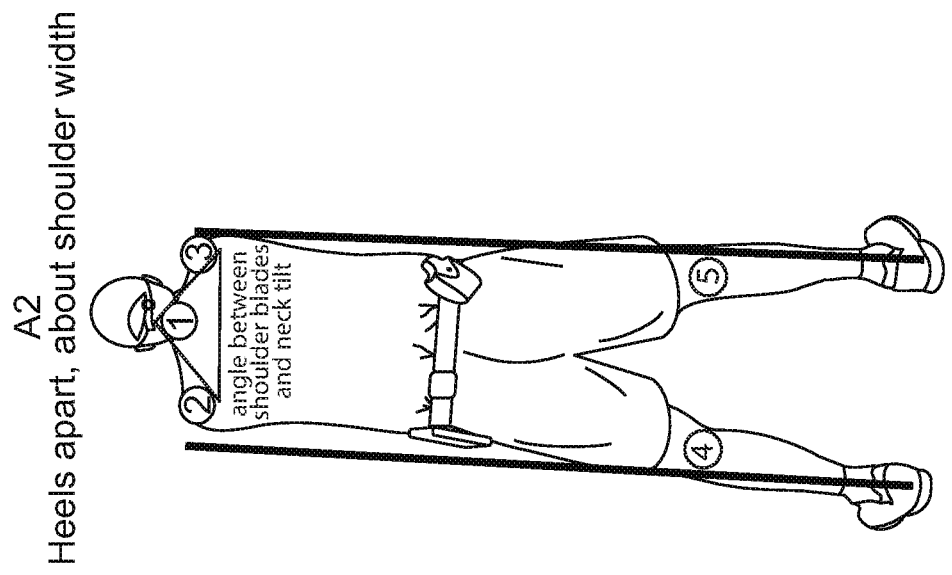
FIGS. 5A-5B are images having marking thereon to depict desired joints and shoulder location, according to some embodiments of the present invention.
Figure 5A:
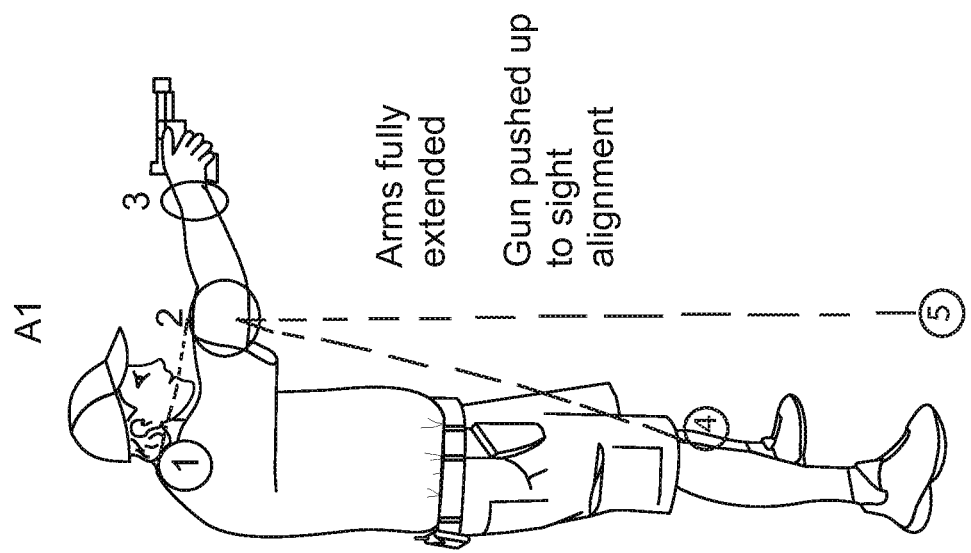

According to some embodiments of the present invention, the imaging data and/or the outputs of the IMU are defaulted to an objective shooting stance. The stance is optionally adjusted to a zero angle based on the shooter's skeletal anatomy. FIG. 5A is an image showing angles between exemplary joints 1, 2, 3 and 4 and point 5 which is the ground. A calculation of a current angle of these joints based on outputs of the IMUs and/or imaging data, as shown in the figure, allow producing a current stance for estimating whether the shooter is in the right pose for accurate shooting. Optionally, as further described below, the display 107 of the client device 99 and/or the presentation unit 210 will indicate by a voice or lighting notification or sequence and/or a vibration notification or sequence when the shooter is at the right shooting position. FIG. 5B shows a required ratio of shoulder blades and neck tilt with respect to knees position. The required ratio may be determined from an image analysis of the imaging data when the camera(s) are positioned to image the shooter during the shooting.

Optionally a pressure sensor in a glove or imaging data may be analyzed to detect wrist alignment with a pistol muzzle and compare to a position of the target 216.

Figure 6:
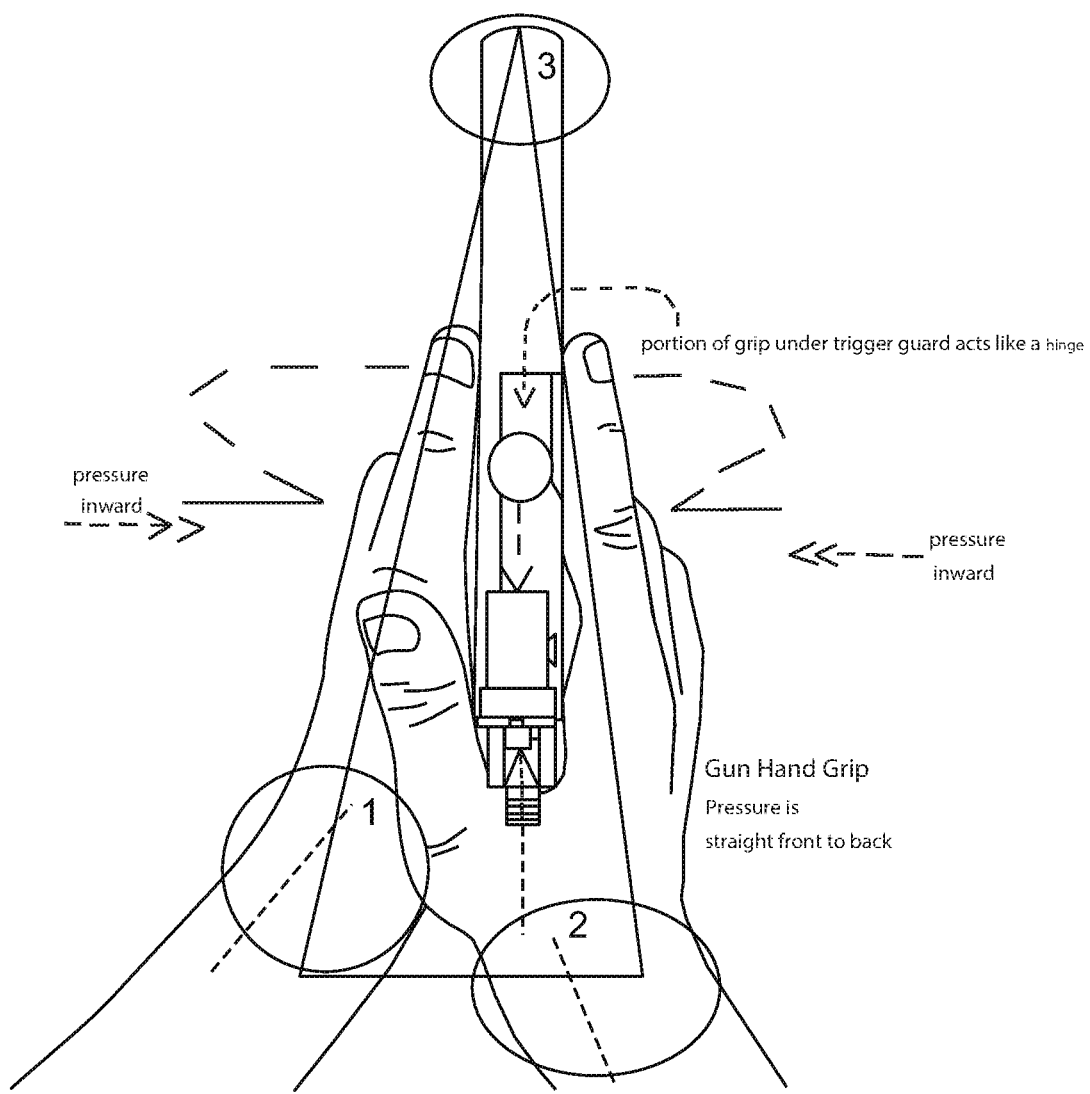
FIG. 6 is an image having marking thereon to depict features indicative of a good firearm grip by imaging data analysis, according to some embodiments of the present invention.

Optionally, a camera may be placed above the shooter to detect a triangle position as depicted in FIG. 6, optionally with respect a shooting line to the target 216. The triangle may be reevaluated from lateral imaging.

Figure 7:
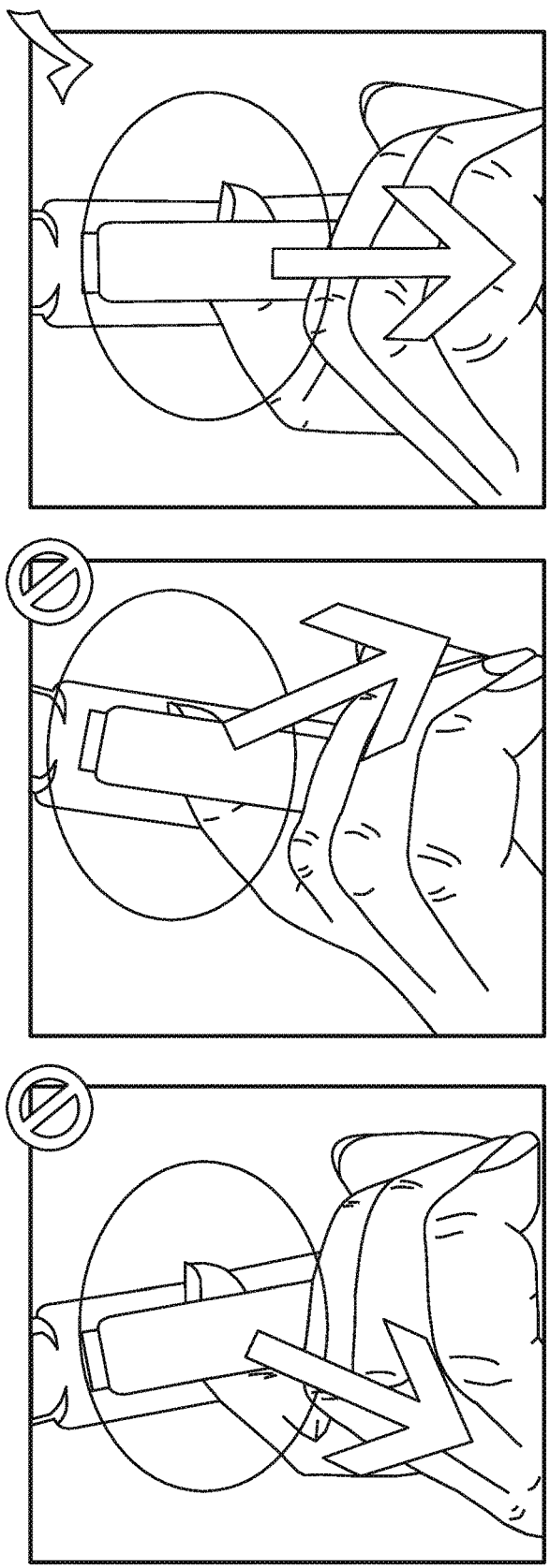
FIG. 7 is an image having marking thereon to depict features indicative of good and bad firearm grips by imaging data analysis, according to some embodiments of the present invention.

Optionally, a camera may be placed below the shooter, focused on the trigger area to detect an angle of a trigger movement of the trigger finger and direction of the trigger pull with respect to the muzzle direction. For example, see FIG. 7.

Optionally, the IMU outputs are analyzed to calculate tilt and angle needed based on target location and shooter's stance.

As shown at 310, presentation instructions are now presented to shooter on the display 107 of the client device 99 and/or the presentation unit 210 of the wearable device 98 before an additional shooting event is detected. The shooting instructions are optionally instructions indicative of a desired physiological parameter change and/or status, such as a pose change and/or status, a limb location change and/or status, a breathing pattern change and/or status, a stress level indication. The presentation allows the user to correct the physiological parameter before initiating another shooting event.

Optionally, the presentation instructions are outputted using audio feedback unit such as a speaker, for instance of the wearable device 98 and/or earphones connected to the mobile device 99. The instructions may be "relax", "stop breathing after exhaling" "point lower about 2 fingers", and/or "shoot slower/faster".

Optionally, as shown at 311, the outputs of the IMU 211 are analyzed to detect current physiological parameters of the shooter 215 and to determine accordingly when the user is in a desired shooting pose and/or state, for example holding the firearm right and firm, being in a breathing state which is suitable for shooting (e.g. holding his breath after exhaling), and/or the like. Optionally, shooter performance parameters such as response time, hand vibration, trigger squeeze time and/or the like as calculated. Optionally, current physiological parameters are detected using imaging data captured using cameras as described above.

As shown at 312, 307-311 may be repeated in each shooting round, optionally being further personalized based on information gathered in each shooting round.

According to some embodiments of the present invention, the IMU sensors are placed on the shooter and/or the firearm to measure a recoil spectrum and compare each shot to shooter's stance. The differences between the right stance (e.g. a stance identified as achieving good shooting performance) and a deviation from the right stance are assigned to a recoil scale. Each joint or supporting point per right stance is scored in order to assign a specific attribution to overall stance performance. This allows the system to allow evaluation of performance and dissection of each failure or deviation from the right stance (for example left hand elbow scored 3 out of 10 due to angle of joint with respect to firearm. Therefore, left elbow was the single point of failure in the drill).

In use, the IMU sensors measure recoil patterns and compare them to a right stance allowing a calculation of recoil specific pattern to the shooter's proficiency, mass, size and/or the like against a specific firearm, ammunition, aftermarket parts and accessories. There is a clear distinction between the recoil of two identical types of ammunition from different brands. The same goes for firearms. While different ammunition may have the same unit of mass, the recoil is different due to the type of alloy used for the casing of, the projectile, type of propellant and the pressure the bullet is sealed.

Although the above refers to target 216 which is stationary, the target may be a moving target or shoot at from a moving platform. In such embodiments, the sensor data may be aligned or normalized according to outputs of a sensor such as altimeter, wind meter, Hygrometer, gyroscope, accelerometer and/or the like. Optionally, an imaging sensor locked on a target synced with any of the above mentioned sensors calculates the speed of the aircraft, angle of axis, direction, wind speed and direction with respect to the speed and direction of the object. LED, sound and/or vibration acknowledgement may be presented to the shooter as described above to indicate when to shoot in the moment with the highest chance of hit. The shooter may use a predictive LOMAH system.

Figure 8A:
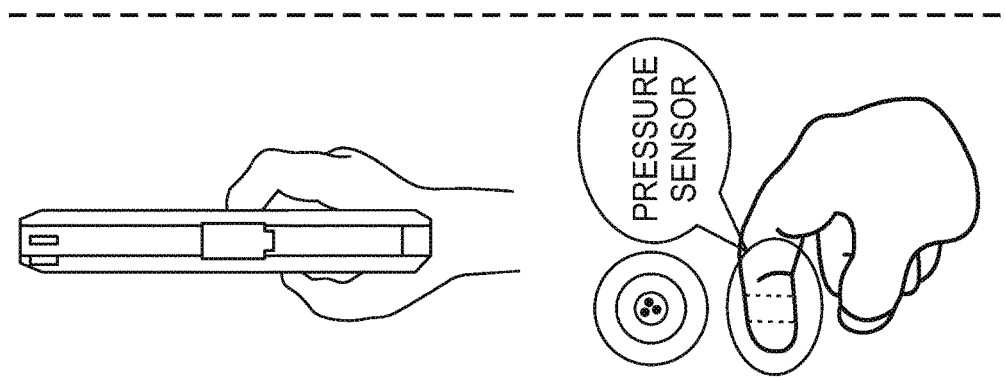
FIGS. 8A-8C are depictions of possible locations of a sticker having a pressure sensor thereon for measuring the amount of pressure applied during firearm triggering, according to some embodiments of the present invention.
Figure 8B:
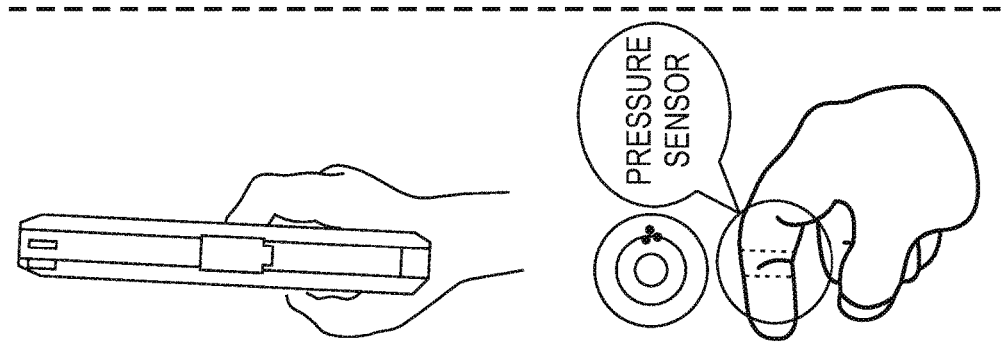
Figure 8C:
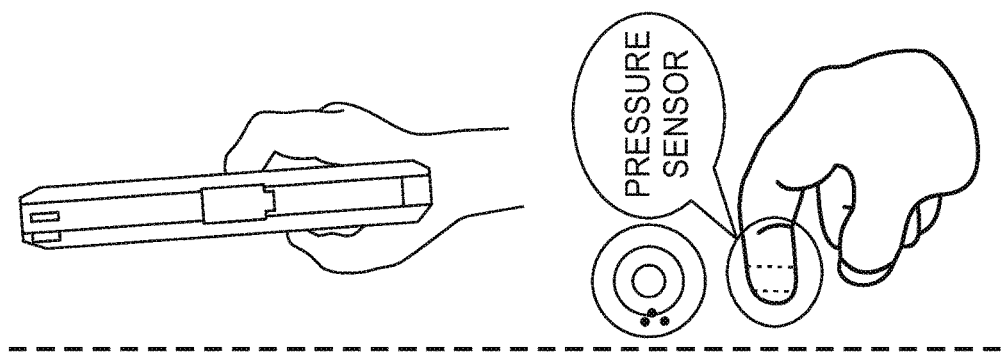
Figure 9:
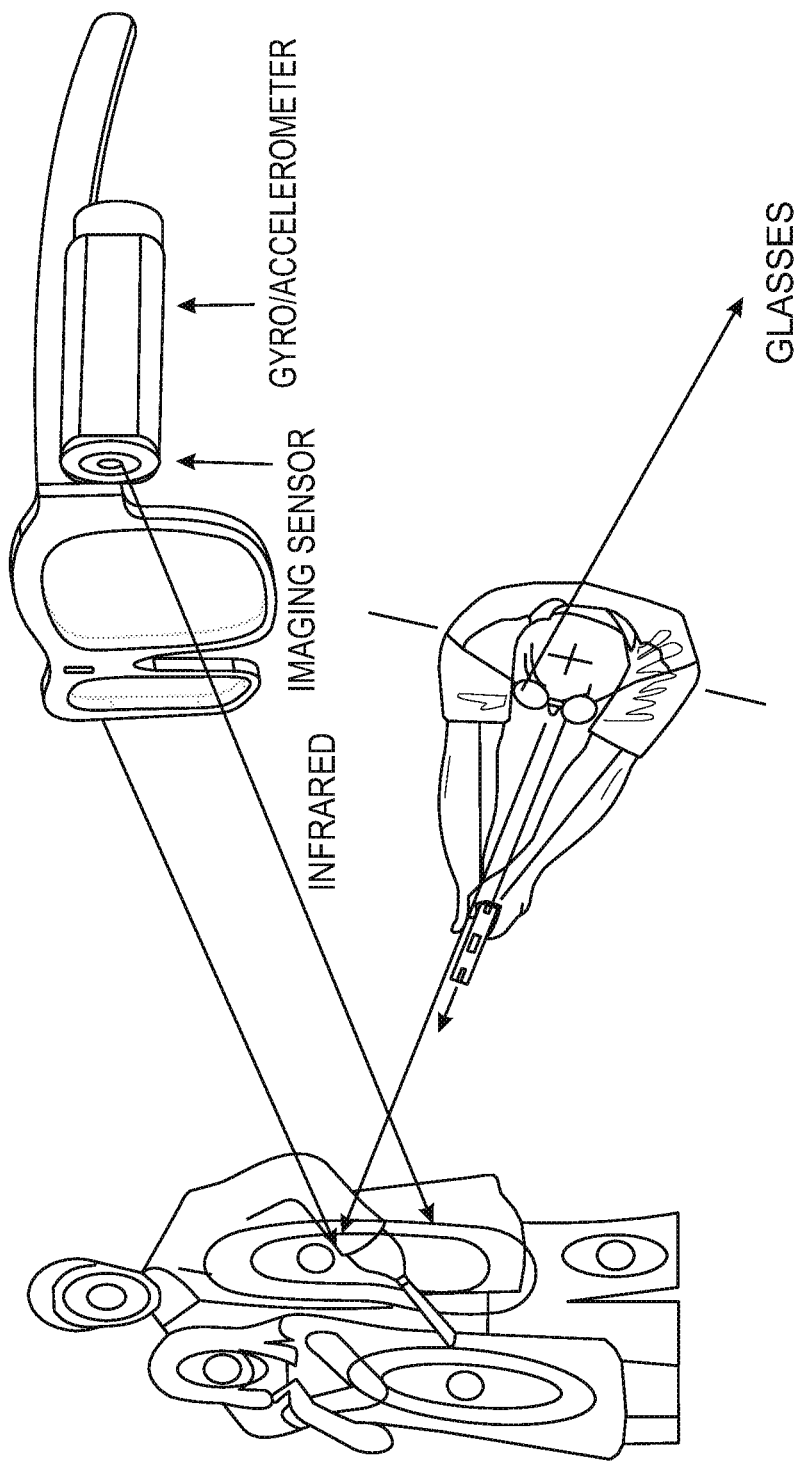
FIG. 9 is a schematic illustration of head on display for assisting in shooting, according to some embodiments of the present invention.

Additionally or alternatively, a ring like pressure sensor and/or a sticker having a sensor therein is place on the shooting finger to measure the pressure applied when a trigger is pulled. See for example FIGS. 8A-8C which depict a sticker having a pressure sensor for measuring the pressure applied during the shooting and different locations of placing the sticker on the finger. All sensors will send data sufficient to calculate needed pressure of pull and angle of pull based on the shooter's mass, specific firearm, specific part (i.e. aftermarket trigger, aftermarket trigger return spring etc.). FIG. 9 is an exemplary glove that gathers movement data from fingers. This data can be compared with data from palm position in relation to the forearm to explain LOMAH results. In order to determine a distance of a shooter from a camera capturing imaging data imaging the shooter (data which may be correlated to distance from target) and keep the results accurate, ultrasonic sensors placed on shooter and imaging processors can pinpoint the distance between the two.

An exemplary glove measuring a distance between target 216 and the shooter 215. Optionally, an imaging sensor coupled with IMU is synchronized with data of other sensors on the shooter will do one or more of the following:

1. Identify the target and assign a "Locking ID" to each individual target.
2. Create classification of BAD/GOOD targets for purpose of live fire or tactical drill i.e. hostage situation.
3. Identify friend or foe and decrease risk of friendly fire.
4. Detect friend or foe by assigning different colors on Head UP Display (HUD). For example see FIG. 9.
5. Display results of LOMAH on HUD.
6. Calculate the risk and assign a value to LOMAH prediction in a situation such as FIG. 9 based on data from all sensors on the shooter and firearm.
7. Calculate data from firearm and shooters position and stance to evaluate alignment with target in sight.
8. Predict results of LOMAH.
9. Assist with shot timing decision by way of acknowledgment, for example LED, sound, and vibration.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems and methods will be developed and the scope of the term a processor, a module, an interface, a mobile device and a wearable device is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for improving shooting results of a shooter through calculation of real time shooting instructions by calibrating data extracted from images of a shooting target and outputs of at least one inertial measurement unit (IMU) mounted on a body of the shooter, comprising:

acquiring from at least one image sensor of a mobile device, and analyzing by an image processing analysis, at least one image depicting the shooting target following a shooting event of a firearm, to calculate a result of the shooting event;

receiving and analyzing, during a period preceding said shooting event, the outputs of the at least one IMU which is supported by at least one wearable device worn by the shooter during said shooting event to calculate at least one physiological parameter of said shooter during said period;

calculating at least one shooting parameter by correlating between said at least one physiological parameter and said result, said at least one physiological parameter is a member of a group consisting of a pose of the body of the shooter, a position of a limb of the shooter, a distance between knees of the shooter, and a breathing pattern of the shooter;

calculating the shooting instructions based a correlation between additional outputs of said at least one IMU and said at least one shooting parameter, said shooting instructions including at least one change to said at least one physiological parameter predicted to improve a result of a next shot by the shooter; and instructing a presentation of said shooting instructions on a display of said mobile device or by a presentation unit of said at least one wearable device before an additional shooting event is detected.

2. The method of claim 1, wherein said analysis of the outputs of the at least one IMU comprises correlating outputs of a gyro module of said at least one IMU with outputs of an accelerometer module of said at least one IMU.

3. The method of claim 1, further comprising detecting said shooting event by an analysis of said at least one image.

4. The method of claim 1, further comprising instructing a presentation a correctness of a shooter physical state based on an analysis of said additional outputs of said at least one IMU on said display or by said presentation unit.

5. A system for improving shooting results of a shooter through calculation of real time shooting instructions by calibrating data extracted from images of a shooting target and outputs of at least one inertial measurement unit (IMU) mounted on a body of a shooter, comprising: a mobile device having at least one processor and at least one image sensor adapted to capture at least one image depicting the shooting target; at least one wearable device having a mount supporting a location of the at least one IMU while the at least one wearable device is worn by the shooter; wherein said at least one processor adapted to execute a training code for: acquiring from the at least one image sensor, and analyzing the at least one image depicting the shooting target following a shooting event of a firearm, to calculate a result of the shooting event, receiving and analyzing, during a period preceding said shooting event, the outputs of said at least one IMU to calculate at least one physiological parameter of said shooter during said period, calculating at least one shooting parameter by correlating between said at least one physiological parameter and said result, said at least one physiological parameter is a member of a group consisting of a pose of the body of the shooter, a position of a limb of the shooter, a distance between knees of the shooter, and a breathing pattern of the shooter, calculating the shooting instructions based on a correlation between additional outputs of said at least one IMU and said at least one shooting parameter, said shooting instructions including at least one change to said at least one physiological parameter predicted to improve a result of a next shot by the shooter, and instructing a presentation of said shooting instructions on a display of said mobile device or by a presentation unit of said at least one wearable device before an additional shooting event is detected.

6. The system of claim 5, wherein said at least one shooting parameter is calculating using a classifier generated by a machine learning technique.

7. The system of claim 5, wherein said at least one wearable device further comprises an additional sensor for detecting pressure applied by a finger on a trigger of said firearm; wherein said analysis comprises combining said pressure with said outputs of said at least one IMU.

8. The system of claim 5, wherein said at least one wearable device further comprises an additional sensor for measuring at least one biological parameter of said shooter; wherein said analysis comprises combining said at least one measured biological parameter with said outputs of said at least one IMU.

9. The system of claim 8, wherein said additional sensor is selected from a group consisting of a Heart rate monitor (HRM), a moisture sensor, a temperature sensor, a plethysmogram, an Electrodermal activity (EDA) Sensor, a Galvanic skin response (GSR) Sensor, an engagement sensor and an excitement sensor.

10. The system of claim 8, wherein said at least one measured biological parameter is selected from a group consisting of body temperature, blood pressure, pulse (heart rate), and breathing rate.

11. The system of claim 5, wherein said at least one wearable device is a bracelet.

12. The system of claim 5, wherein said at least one wearable device comprises a compression sleeve; wherein said at least one IMU comprises an upper IMU mounted to be placed above an upper arm of an arm of said shooter and a lower IMU mounted to be placed above a lower arm of said arm of said shooter.

13. The system of claim 5, wherein said at least one wearable device comprises a pair of sleeves locating said at least one IMU to monitor knees during said period.

14. The system of claim 5, wherein said at least one wearable device comprises a glove locating an additional sensor to monitor pressure applied by said shooter on a trigger of said firearm during said period; wherein said analysis comprises combining said pressure with said outputs of said at least one IMU.

15. The system of claim 5, wherein said at least one wearable device comprises a ring or a sticker locating an additional sensor on a finger of said shooter to monitor pressure applied by said shooter on a trigger of said firearm during said period; wherein said analysis comprises combining said pressure with said outputs of said at least one IMU.

16. The system of claim 5, wherein said at least one wearable device comprises a plurality of compression sleeves each worn by a different limb of said shooter; wherein said calculating at least one physiological parameter is performed by correlating outputs from said plurality of compression sleeves.

17. The system of claim 5, wherein said identified at least one change is according to a personalized reference skeleton position with respect to standard shooting techniques.

18. The system of claim 5, wherein said at least one processor is further adapted to execute said training code for acquiring acceleration patterns of an ideal shooting technique and comparing said acquired patterns to said outputs, and wherein said identified at least one change is according to a result of said comparison.

19. The system of claim 5, wherein said at least one IMU is configured to measure recoil patterns and to compare said recoil patterns to a right stance;

wherein said training code executed by said at least one processor includes code for calculating recoil specific pattern associating at least one parameter of said shooter and at least one parameter associated with the firearm;

wherein the at least one parameter of said shooter is selected from a group consisting of: the shooter's proficiency, the shooter's mass and the shooter's size; and wherein said at least one parameter of said firearm is selected from a group consisting of: a specific firearm, an ammunition, aftermarket parts of the firearm and accessories.

* * * * *